(12) United States Patent
Ishida et al.

(10) Patent No.: US 8,993,095 B2
(45) Date of Patent: Mar. 31, 2015

(54) COMPOSITE MATERIAL AND COATED CUTTING TOOL

(75) Inventors: Tomoyuki Ishida, Itami (JP); Hideki Moriguchi, Itami (JP); Akihiko Ikegaya, Itami (JP)

(73) Assignees: Sumitomo Electric Industries, Ltd., Osaka (JP); Sumitomo Electric Hardmetal Corp., Hyogo (JP)

( * ) Notice: Subject to any disclaimer, the term of this patent is extended or adjusted under 35 U.S.C. 154(b) by 846 days.

(21) Appl. No.: 12/677,979

(22) PCT Filed: Sep. 12, 2008

(86) PCT No.: PCT/JP2008/002527
§ 371 (c)(1),
(2), (4) Date: Jun. 10, 2010

(87) PCT Pub. No.: WO2009/034716
PCT Pub. Date: Mar. 19, 2009

(65) Prior Publication Data
US 2010/0255264 A1    Oct. 7, 2010

(30) Foreign Application Priority Data
Sep. 14, 2007    (JP) .................. 2007-239617

(51) Int. Cl.
*B32B 3/10*    (2006.01)
*C23C 30/00*    (2006.01)
*B23B 27/14*    (2006.01)
*C22C 29/08*    (2006.01)

(52) U.S. Cl.
CPC ............. *C23C 30/005* (2013.01); *B23B 27/146* (2013.01); *B23B 2222/16* (2013.01); *B23B 2222/28* (2013.01); *B23B 2228/105* (2013.01); *C22C 29/08* (2013.01); *C22C 2204/00* (2013.01)
USPC ........................... 428/172; 428/174; 428/213

(58) Field of Classification Search
USPC ......................................................... 428/172
See application file for complete search history.

(56) References Cited

U.S. PATENT DOCUMENTS 3,909,895 A * 10/1975 Abrahamson et al. ......... 407/119
4,109,737 A * 8/1978 Bovenkerk .................... 175/430
(Continued)

FOREIGN PATENT DOCUMENTS

| JP | 58-141304 A | 8/1983 |
|---|---|---|
| JP | 6-240308 A | 8/1994 |

(Continued)

OTHER PUBLICATIONS

JPO Website Machine English Translation of JP 07-207398, Masayoshi et al., Aug. 8, 1995.*

(Continued)

*Primary Examiner* — Maria Veronica Ewald
*Assistant Examiner* — Laura Auer
(74) *Attorney, Agent, or Firm* — Ditthavong & Steiner, P.C.

(57) ABSTRACT

The present invention provides a composite material that is excellent in the bonding ability between a cemented carbide layer and a cermet layer is excellent and deformation after sintering can be suppressed and a coated cutting tool having a base containing the composite material. A composite material $10_{ii}$ is obtained by laminating a cemented carbide layer 11 and a cermet layer 12 and has the cemented carbide layer 11 on the surface side. The boundary between both the layers 11 and 12 has a concave portion 23, and the maximum depth $D_{max}$ of the concave portion 23 is 50 μm or more and 500 μm or lower. When the thickness of the composite material is defined as h1 and the thickness of the cemented carbide layer 11 is defined as h2, h2/h1 is in the range of more than 0.02 and 0.4 or lower. By providing the concave portion 23 to the boundary, both the layers 11 and 12 are sufficiently bound and the bonding ability therebetween is excellent. Due to the fact the cemented carbide layer 11 satisfies the given thickness mentioned above, the composite material 10 is difficult to deform.

21 Claims, 4 Drawing Sheets

(56) References Cited

U.S. PATENT DOCUMENTS

| | | | | |
|---|---|---|---|---|
| 5,467,669 | A | * | 11/1995 | Stroud .......................... 76/108.2 |
| 5,543,235 | A | * | 8/1996 | Mirchandani et al. ......... 428/547 |
| 5,697,994 | A | * | 12/1997 | Packer et al. ..................... 51/309 |
| 5,722,803 | A | * | 3/1998 | Battaglia et al. ............... 407/119 |
| 6,387,552 | B1 | * | 5/2002 | Iyori et al. ..................... 428/698 |
| 2002/0028323 | A1 | * | 3/2002 | Nakamura et al. ............. 428/216 |
| 2008/0210064 | A1 | * | 9/2008 | Mikus et al. .................... 82/1.11 |
| 2008/0260477 | A1 | * | 10/2008 | Omori et al. ................... 407/119 |

FOREIGN PATENT DOCUMENTS

| | | |
|---|---|---|
| JP | 7-207398 A | 8/1995 |
| JP | 8-92607 A | 4/1996 |
| JP | 2000-345213 A | 12/2000 |
| JP | 2004-202597 A | 7/2004 |
| JP | 2005-272877 A | 10/2005 |
| WO | WO 2006103982 A1 * | 10/2006 |
| WO | WO 2009/034716 A1 | 3/2009 |

OTHER PUBLICATIONS

International Search Report for PCT/JP2008/002527, dated Dec. 16, 2008, pp. 1-2.

Notification of Reasons for Rejection for Japanese Application No. 2009-532064 dated Dec. 27, 2012; Partial English translation included; pp. 1-5.

* cited by examiner

COMPOSITE MATERIAL AND COATED CUTTING TOOL

TECHNICAL FIELD

The present invention relates to a composite material having both a cemented carbide layer and a cermet layer and a coated cutting tool having a base containing the composite material. In particular, the present invention relates to a composite material that is excellent in bonding ability between the cemented carbide layer and the cermet layer and that can suppress deformation after sintering.

BACKGROUND ART

Heretofore, a cemented carbide or a cermet in which ceramic particles (hard phase), such as WC (tungsten carbide) or Ti compounds, such as TiCN (titanium carbonitride) are bound with iron-group metals (binder phase), such as Co or Ni, are used for base materials of cutting tools.

In general, the cermet has high hardness because the cermet contains Ti compounds, such as TiCN, as a main hard phase, but the toughness thereof is lower than that of the cemented carbide containing WC as a main hard phase. Therefore, the cutting tool having a base containing the cermet has a narrow application range and is mainly utilized for low-load finish processing. In contrast, a composite material in which the cermet and the cemented carbide are laminated and bound has been proposed (Patent Literatures 1 and 2). Patent Literature 1 discloses a bound material obtained by individually producing a cemented carbide and a cermet, grinding the bonding surfaces thereof to reduce the surface roughness, laminating the cemented carbide and the cermet, and integrating the laminate by heating. Patent Literature 2 discloses a cemented carbide member obtained by laminating sintered compacts individually produced, and bonding the same by electrically heating or, for further increasing the bonding strength, by laminating green compacts individually produced, and sintering the laminate.

[Patent Literature 1]: Japanese Unexamined Patent Application Publication No. 6-240308
[Patent Literature 2]: Japanese Unexamined Patent Application Publication No. 7-207398

DISCLOSURE OF INVENTION

Problems to be Solved by the Invention

According to the production method disclosed in Patent Literature 1, the sintered compacts are produced one, the surfaces thereof are ground, and then the compacts are bound by heating, and thus the number of processes increases. Thus, an improvement of productivity is desired. In the bonding material, the boundary (bonding interface) between the cemented carbide and the cermet becomes flat because the bonding surface is ground. When the boundary is flat, the separation of the cemented carbide and the cermet is easy to occur due to differences in properties, such as a thermal expansion coefficient, between the cemented carbide and the cermet. According to the method including laminating and bonding sintered compacts or molded products disclosed in Patent Literature 2, any method includes a metal die forming process, and thus it is considered that the bonding surface of each molded product or each sintered compact is flat. Therefore, also in the method, the separation is likely to occur. When the separation of the cemented carbide and the cermet occurs, both the properties of the cemented carbide and the properties of the cermet cannot be sufficiently utilized. When there are gaps between the sintered compacts or the molded products, a binder pool is likely to generate in the gaps. Therefore, it is considered that, in order to prevent the generation of the binder pool, the bonding surface is formed into a flat shape in the former techniques.

It is an object of the present invention is to provide a composite material in which a cemented carbide and a cermet do not easily separate. It is another object of the present invention is to provide a coated cutting tool containing the composite material as a base and having excellent wear resistance and toughness.

Means for Solving the Problems

A sintered compact having a lamination structure is produced not by laminating green compacts or sintered compacts, and sintering the laminate, which is performed in former techniques, but by granulating a row material powder for constituting each of a cemented carbide layer and a cermet layer, laminating the powders while controlling the dimension of the granulated powers to form green compacts, and integrating the green compacts by sintering. Moreover, a sintered compact having a lamination structure is produced by producing a laminated green compact by, for example, devising the shape of a punch to be used for molding. By producing the sintered compact having a lamination structure as described above, the productivity of a composite material in which both the layers are laminated can be increased and moreover a composite material excellent in the bonding ability between both the layers is obtained.

In the composite material of the invention, at least one cemented carbide layer and at least one cermet layer are laminated and the cemented carbide layer is disposed on at least one portion of the surface side thereof. The boundary between the cemented carbide layer and the cermet layer has a concave portion. The maximum depth of the concave portion is 50 μm or more and 500 μm or lower. When the thickness of a portion having the largest thickness in the lamination direction of the composite material is defined as h1 and the thickness of a portion having the largest thickness in the lamination direction of the cemented carbide layer disposed on the front surface side of the composite material is defined as h2, h2/h1 is more than 0.02 and 0.4 or lower.

In the composite material of the invention having the above-described structure, the boundary between the cemented carbide layer and the cermet layer is not flat and a specific concave portion is present at the boundary. Therefore, the separation of the cemented carbide layer and the cermet layer is difficult to occur and the bonding ability is excellent. Thus, the properties of both the layers can be sufficiently utilized. In particular, the toughness of the composite material of the invention is excellent by providing the cemented carbide layer having a specific thickness at the surface side. Therefore, the composite material of the invention can be utilized to a field to which composite materials are difficult to be applied because chipping occurs when only the cermet is provided. Therefore, for example, when the composite material of the invention is used for a base of a cutting tool, a cutting tool having high toughness and excellent wear resistance can be obtained. Hereinafter, the present invention will be described in detail.

[Composite Material]
<Lamination Structure>

The composite material of the invention is a laminate in which a cemented carbide layer and a cermet layer are laminated and integrated. The composite material has the cemented carbide layer at least one portion of the surface side thereof. The composite material partially having a lamination structure may be acceptable. However, when the composite material is entirely structured into a lamination structure, the production properties of the composite material are favorable. As specific aspects, a two-layer structure in which one cermet layer and one cemented carbide layer are laminated, a three-layer structure in which one cermet layer is disposed as an internal layer and a pair of cemented carbide layers are disposed in such a manner as to sandwich both sides of the internal layer, an enclosed structure (two or more layers on the cross section) in which one cermet layer is disposed as an internal layer and a cemented carbide layer is disposed in such a manner as to cover the entire outer surface, a concentric structure (two or more layers on the cross section) in which one cermet layer is disposed as an internal layer and a cemented carbide layer is disposed in such a manner as to partially surround the outer surface to partially expose the cermet layer, etc., are mentioned. The number of laminations in each of the above-described structures is not particularly limited. The composite material of the invention may have two or more cermet layers and cemented carbide layers.

<Bonding Method>

The cemented carbide layer and the cermet layer are integrally bound by mixing a raw material powder for constituting each layer, granulating the powders by a granulating device to obtain granulated powders, successively supplying the granulated powders to a metal die to laminate the powders, pressurizing the laminated powders by a punch in this state to produce a laminated green compact, and sintering the laminated green compact. More specifically, the composite material of the invention is produced not by laminating sintered compacts or green compacts, which has been performed heretofore, but by laminating raw material powders before molding. The composite material of the invention can be produced by increasing the number of supplying powder in one metal die in a usual production process of cemented carbide or cermet. Therefore, the composite material of the invention can be easily produced with favorable productivity without greatly deviating from a series of processes of usually-performed powder metallurgy. In the production of the composite material of the invention, the process cost increases very little other than a press process, and thus the production method is economically preferable. In particular, even when the number of lamination is large, the composite material of the invention can be easily produced by producing a laminated green compact of the above-described raw material powders. For example, when the composite material of the above-described two-layer structure or three-layer structure is produced as described above, the entire boundary (bonding interface) between the cemented carbide layer and the cermet layer later can be formed into a shape having a concave portion described later, thereby obtaining a composite material having excellent bonding ability.

<Boundary Shape>

In the composite material of the invention, the boundary (bonding interface) between the cemented carbide layer and the cermet layer is present according to the number of lamination. In the composite material of the invention, at least one boundary has not a flat shape (same plane) throughout the boundary but has at least one concave portion. The maximum depth of the concave portion is adjusted to be 50 μm or more and 500 μm or lower. Due to the presence of the concave portion that satisfies the above-described specific maximum depth at the boundary between both the layers, both the layers are connected to each other and are difficult to separate in the composite material of the invention. When all the boundaries present in the composite material have such concave portions, the bonding ability between both the layers are excellent, and thus such a structure is preferable. In particular, it is preferable for the boundary between the cemented carbide layer disposed on the surface side of the composite material of the invention and the cermet layer adjacent to the cemented carbide layer to have the above-described concave portion.

When the maximum depth of the concave portion is smaller than 50 μm, the connected degree between both the layers is small and a possibility that the separation of the layers occurs is high due to stress in the transverse direction (mainly a direction orthogonal to the lamination direction) generating when each layer shrinks during sintering. The connected degree between both the layers becomes large as the maximum depth is larger. However, when the maximum depth is larger than 500 μm, deformation due to a difference (a difference in pressing pressure) of the shrinkage degree of each layer becomes large, and thus a desired shape is not obtained. In particular, by providing a concave portion having a maximum depth of 50 μm or more and 200 μm or lower, a structure that is difficult to deform and has resistance against the above-described stress in the transverse direction can be obtained. The number of such a concave portion of each boundary may be one. When two or more of the concave portions are present, the bonding ability between both the layers is further improved. Moreover, each boundary may have, in addition to the concave portion, fine irregularities whose maximum depth does not satisfy the range mentioned above. The shape of the concave portion is not particularly limited. The cross section thereof may have a linear shape or a round (curve) shape.

The maximum depth of the concave portion of the boundary is measured using an observation image obtained by observing the cross section of the composite material under a microscope. Specifically, a composite material 100 is disposed so that most of a boundary (bonding interface) 103 between a cemented carbide layer 101 and a cermet layer 102 is not orthogonal to a horizontal reference surface S as shown in FIG. 1. In this case, the direction orthogonal to the reference surface S is defined as a lamination direction (black arrow in FIG. 1). In the arrangement, the length l from the reference surface S to the boundary is measured throughout the boundary 103. In the length l, a difference between the minimum length: $l_{min}$ and the maximum length: $l_{max}(l_{max}-l_{min})$ is defined as the maximum depth $D_{max}$. In FIG. 1, the irregularities of the cemented carbide layer and the boundary are emphasized. The same applies to the following figures.

<Thickness of Cemented Carbide Layer>

In the composite material of the invention, the cemented carbide layer disposed on the surface side thereof (hereinafter referred to as a surficial layer comprising cemented carbide) has a specific thickness. When the surficial layer comprising cemented carbide is excessively thin, a high cutting stress is applied to the cermet layer having poor toughness and thus chipping is likely to occur when the composite material of the invention is used as a base of a cutting tool. In contrast, when the surficial layer comprising cemented carbide is excessively thick, the proportion of the cemented carbide layer relative to the concave portion present on the boundary between the surficial layer comprising cemented carbide and the cermet layer adjacent to the layer becomes excessively high, and thus an effect of suppressing the separation of the layer by the concave portion is hard to obtain. When the surficial layer comprising cemented carbide is excessively thick, the compression stress of the surface of the surficial layer comprising cemented carbide tends to become excessively small. It is expected that a certain degree of compression stress contributes to improvement of breakage resistance. Based on the above-described reasons, in the composite material of the invention, the proportion of the thickness of the surficial layer comprising cemented carbide relative to the thickness of the whole composite material satisfies a specific range. Specifically, when the thickness of a portion having the largest thickness in the lamination direction of both the layers of the composite material is defined as h1 and the thickness of a portion having the largest thickness in the lamination direction of the surficial layer comprising cemented carbide is defined as h2, h2/h1 is more than 0.02 and 0.4 or lower. In particular, it is preferable that h2/h1 be 0.04 or more and 0.2 or lower. When the composite material of the invention is provided with a cemented carbide layer (surficial layer comprising cemented carbide) having a given thickness on the surface side, the toughness of the surface side is increased, which allows the application of the composite material of the invention to a field to which composite materials having only the cermet are difficult to be applied. Moreover, when the thickness of the cemented carbide layer of the composite material of the invention is reduced to be relatively thin, the amount of tungsten which is a rare metal, whose price sharply increases in recent years and which is difficult to supply, decreases. Thus, a reduction in the thickness of the cemented carbide layer is economically preferable. A specific thickness of the surficial layer comprising cemented carbide for increasing the breakage resistance and sufficiently obtaining the separation inhibitory effect is preferably 100 µm or more and particularly preferably 300 µm or more and 700 µm or lower.

The measurement of h1 and h2 is performed using a microscope observation image of the cross section of the composite material in the same manner as in the measurement of the maximum depth described above, for example. Specifically, the composite material 100 is disposed so that the lamination direction is orthogonal to the reference surface S as shown in FIG. 1. Then, in the state, the length $l_f$ from the reference surface S to the surface 101$f$ of the cemented carbide layer 101 is measured throughout the region where the boundary 103 is present, and the length $l_f$ is defined as the thickness T in the lamination direction of the composite material 100. In a portion where the composite material 100 is not in contact with the reference surface S, the length $l_{fu}$ from the reference surface S to the surface facing the reference surface S among the outer surfaces of the composite material 100 is measured, and a difference ($l_f-l_{fu}$) between the length $l_f$ and the length $l_{fu}$ at the position is defined as the thickness T. The maximum $T_{max}$ of the thickness T is defined as h1. Moreover, in the arrangement, the length l from the reference surface S to the boundary and the length $l_f$ at the same position are measured throughout the boundary 103, and then a difference: $l_f-l$ is defined as the thickness t in the lamination direction of the cemented carbide layer 101. The maximum $t_{max}$ of the thickness t is defined as h2. As shown in FIGS. 1(II) and 1(III), when one surface of the composite material 100 is entirely in contact with the reference surface S, h1 may be determined by measuring the surface 101$f$ of the cemented carbide layer 101 by a measurement device, such as a height gauge.

<Cemented Carbide Layer>
<<Hard Phase>>

The cemented carbide layer contains WC particles as a main hard phase and is constituted by a WC-based cemented carbide containing an iron-group metal, such as Co, as a main binder phase. The cemented carbide layer contains the WC particles serving as a hard phase in a higher proportion than the cermet layer. In particular, the cemented carbide layer contains W and WC in the proportion of preferably more than 65 mass % in total and more preferably 80 mass % or more in total. When the average grain size of the WC particles is small particularly in the range of 0.1 µm or more and 1.0 µm or lower, a cemented carbide layer having high hardness and excellent wear resistance is obtained. When the average grain size of the WC particles is large in the range of 0.1 µm or more and 1.0 µm or lower, a cemented carbide layer having excellent toughness, such as thermal crack resistance, is obtained. When the average grain size of the WC particles is in the range mentioned above, cutting edge treatment in which the cutting edge treatment width is as small as 0.05 mm or lower is easily performed, and a sharp cutting edge line is likely to obtain. Furthermore, when the average grain size of WC particles is in the range mentioned above, by the formation of a coated film by a PVD method on the cemented carbide layer present on the surface of the base in a cutting tool having a base containing the composite material of the invention, crystal grains of the coated film near the interface with the cemented carbide layer are miniaturized following the fine WC particles in the coated film, and thus an effect of increasing the adhesiveness of the film is obtained. The size of the WC particles can be selected according to desired properties. The size of the WC particles in the cemented carbide layer generally depends on the raw material powder, and thus may be adjusted in accordance with the size of the raw material powder. The size of hard phase particles in the cermet layer described later can be similarly adjusted in accordance with the size of the raw material powder.

<<Binder Phase>>

The binder phase mainly contains iron-group metals (more than 80 mass % of iron-group metals) and allows inclusion (solid solution) of elements, which is considered to originate from the raw material powder, in addition to the iron-group metals. The iron-group metals may contain Fe or nickel in addition to Co, but preferably contain only Co. The content of the binder phase in the cemented carbide layer is preferably 3 mass % or more and 20 mass % or lower. When the content thereof is more than 20 mass %, the toughness becomes high but the strength and wear resistance are likely to decrease. When the content thereof is lower than 3 mass %, the toughness is likely to decrease. In particular, the content of 5 mass % or more and 15 mass % or lower is preferable because the toughness is excellent.

<<Other Contents>>

The cemented carbide layer may further contain, in addition to the WC particles or iron-group metals, one or more elements selected from metallic elements of Groups IVa, Va, and VIa of the Periodic Table or compounds or solid solutions containing one or more elements selected from the same metallic elements and one or more elements selected from the group consisting of carbon, nitrogen, oxygen, and boron. As specific elements, Cr, Ta, Ti, Nb, Zr, and V are mentioned and, as the compounds, (Ta, Nb)C, VC, $Cr_2C_3$, NbC, TiCN, etc. are mentioned. These elements or compounds are present while being contained (solid solution) or present in the form of particles and function as a hard phase. Many of these elements and compounds have an action of suppressing the grain growth of the WC particles during sintering. When the cemented carbide layer contains these elements or compounds, the content is preferably 40 mass % or lower (however, 0 mass % is included) in total. The WC particles constitute the remaining portion except these elements or compounds, the binder phase, and impurities.

In particular, it is preferable for the cemented carbide layer to contain Cr. When the amount of the binder phase of the cemented carbide layer is defined as ×1 (mass %) and the content of Cr in the cemented carbide layer is defined as ×2

(mass %), it is preferable that x2/x1 be 0.02 or more and 0.2 or lower. When the content of Cr is as low as 0.02, the grain growth inhibitory effect is not sufficiently obtained. Thus, the WC in the cemented carbide layer becomes coarse, which causes a reduction in wear resistance. In contrast, when the content of Cr is as large as more than 0.2, Cr is likely to precipitate or aggregate in the structure of the cemented carbide, and destruction occurs with the precipitate or the like as the starting point, which causes a reduction in breakage resistance. When the content of Cr is adjusted in the range mentioned above, the liquid phase appearance temperature of the cemented carbide can be adjusted. With an increase in the content of Cr, the liquid phase appearance temperature tends to decrease, and a difference between the liquid phase appearance temperature of the cemented carbide and the liquid phase appearance temperature of the cermet can be made small. By making the difference small, liquid phase movement is suppressed and a reduction in performance, deformation, etc., due to the liquid phase movement can be reduced. The composition of the raw material powder is designed so that the cemented carbide layer has a desired composition.

<<Cutting Edge Treatment>>

When the composite material of the invention is utilized for a base of a cutting tool, at least one portion of the edge line formed with the cemented carbide layer disposed on the surface side serves as a cutting edge. Although the cutting edge may be in a sintered state, when cutting edge treatment, such as honing, is performed, the chipping resistance can be increased and moreover the surface roughness of the work (work material) is made smaller and thus a favorable processed surface is obtained. Here, the base containing cermet has a sharp cutting edge in a sintered state. However, since the toughness is low, chipping is likely to occur. Even when it is attempted to perform cutting edge treatment, sharp cutting edge treatment is difficult to perform due to low toughness, and thus the surface roughness is likely to increase. In contrast, the composite material of the invention has a cemented carbide layer having high toughness at a portion serving as a cutting edge, and thus excellent chipping resistance is achieved even when the cutting edge treatment is not performed. Even when the cutting edge treatment is performed, the surface roughness can be made smaller. This is because the composite material of the invention has a cemented carbide layer having high toughness at a portion to be subjected to the cutting edge treatment, and thus a sharp cutting edge is obtained by the cutting edge treatment. Furthermore, in addition to the improvement of processing accuracy, the occurrence of burr can also be suppressed. As the amount of the cutting edge treatment, the cutting edge treatment width is preferably more than 0 mm and 0.05 mm or lower. When the cutting edge treatment width is more than 0.05 mm, the cutting edge is not sharp, and thus the surface roughness does not become small and the processing accuracy cannot be sufficiently improved. The cutting edge treatment width w is a distance from a flank face 201 to an intersection 203 of an edge line 200 and the rake face 202 in the edge line 200 connecting the flank face 201 and a rake face 202 as shown in FIG. 2.

<<Compression Stress>>

A compression stress can be made to be present in the cemented carbide layer by adjusting the thermal expansion coefficient and the shrinkage factor of the cemented carbide layer and the cermet layer. In particular, when the composite material of the invention in which a certain degree of compression stress is preset in the cemented carbide layer at the surface side thereof is used as a base of a cutting tool, the breakage resistance can be improved. When materials having different thermal expansion coefficients are laminated, the compression stress may arise at a side having a small thermal expansion coefficient, and the compression stress may cause delamination. In contrast, since the composite material of the invention has a concave portion of a specific size at the boundary between both the layers as described above, the delamination resulting from the compression stress is difficult to occur, and thus an effect of improving the toughness by the compression stress can be expected. When the compression stress is excessively high, the delamination occurs. Thus, it is preferable that the compression stress be present in the range such that the separation does not occur. As the adjustment of the compression stress, the adjustment of the thermal expansion coefficient and shrinkage factor as described above is mentioned and, specifically, the adjustment of the composition or the like of the raw material powder is mentioned. The size of the compression stress is determined by wrapping the surface of the cemented carbide layer, and then measuring the vicinity of the center of the surface by XRD, for example. The size of a suitable compression stress is about 0.1 to 3.0 GPa.

<Cermet Layer>

<<Hard Phase>>

The cermet layer at least contains a Ti compound as a hard phase and is constituted by a hard material containing iron-group metals, such as Co or Ni, as a main binder phase. As the Ti compound, at least one compound selected from a carbide of Ti (TiC), a nitride of Ti (TiN), and a carbonitride of Ti (TiCN) is typically mentioned. In addition, as the Ti compound, Ti-containing composite compounds, metallic elements (except Ti) of Groups IVa, Va, and VIa of the Periodic Table, and at least one of C or N, i.e., Ti-containing composite carbides, Ti-containing composite nitrides, and Ti-containing composite carbonitrides, are mentioned. As specific composite compounds, (Ti, W, Mo, Ta, Nb) (C, N), (Ti, W, Nb) (C, N), (Ti, W, Mo, Ta) (C, N), (Ti, W, Mo, Zr) (C, N), etc., are mentioned. Particles containing the Ti compounds constituting the hard phase may be constituted by a single composition (e.g., TiCN) or may have a core-containing structure in which the Ti concentration is different between the center and the vicinity thereof. According to SEM observation, among the particles having the core-containing structure, particles containing Ti in a high proportion at the center appear blackish (black core-particles) and particles containing W in a high proportion at the central appear whitish (white core-particles). The average grain size of these hard phase particles (size containing the peripheral portion in the case of the particles having a core-containing structure) is preferably 0.5 to 5.0 µm and particularly preferably 1.0 to 3.0 µm. When at least W is blended in the a cermet layer, a difference in the thermal expansion coefficient between the cermet layer and the cemented carbide layer is made small, and thus deformation and separation is likely to suppress. Thus, blending W in the cermet layer is preferable. In order for W to be present in the cermet layer, using WC as a raw material is mentioned. The raw material WC is present while being contained (solid solution) in the binder phase or the like in the form of W after sintering. Then, with an increase in the addition amount of raw materials, composite compounds containing WC or W in a high proportion tend to precipitate. The precipitated WC or composite compounds function as the hard phase. Moreover, with an increase in the addition amount of the raw material WC, the white core-particles tend to increase. When WC and W are contained in a proportion of 15 mass % or more in total relative to 100 mass % of the cermet layer, the above-described effects can be expected. With an increase in the total content of W and WC, the difference in the thermal expansion coefficient is easily made small. However, when the total content thereof is excessively high, the effect of increasing toughness due to the presence of the compression stress in the cemented carbide layer is difficult to obtain. Thus, the total content thereof is preferably 65 mass % or lower. The total content of W and WC is more preferably 15 mass % or more and 40 mass % or lower. The amount of WC and W in the cermet layer generally depends on the addition amount of the raw material powder WC. Thus, the amount of WC and W can be adjusted in the above-described given range by adjusting the addition amount of the raw material WC. When WC having a relatively large average grain size of 1 to 8 μm and particularly 3 to 5 μm is used as the raw material WC, the WC precipitated in the cermet layer becomes relatively coarse particles, and thus an effect of improving resistance against progress of cracks is obtained. The measurement of the amount of WC in the cermet layer can be performed by identifying the compound by XRD or the like, and then analyzing the composition using EDX, EPMA, fluorescent X-rays, IPC-AES, or the like. The measurement of the amount of W can be performed by analyzing the composition by EDX or the like.

<<Binder Phase>>

The content of the binder phase in the cermet layer is preferably 8 mass % or more and 20 mass % or lower. When the content thereof exceeds 20 mass %, the toughness becomes high, but, in contrast, the strength or wear resistance decreases. When the content thereof is lower than 8 mass %, the sintering properties and toughness decrease. The binder phase mainly contains iron-group metals (more than 80 mass % of iron-group metals) and allows inclusion (solid solution) of elements, which is considered to originate from the raw material powders, other than the iron-group metals. The iron-group metals may contain Ni in addition to Co. However, when the proportion of Ni is high, liquid phase movement in which Ni moves to the cemented carbide layer is likely to occur during sintering or the like. In particular, when the amount of the liquid phase movement is large, there is a possibility that the composition of the cemented carbide layer changes, and thus a reduction in performance, such as a reduction in hardness, deformation of the composite material of the invention, etc., may occur. Therefore, it is preferable for the binder phase of the cermet layer to contain Co in a higher proportion. The proportion of Co is preferably 80 mass % or more and particularly 90 mass % or more relative to 100 mass % of the iron-group metals in binder phase of the cermet layer. It is optimal that only Co is contained. Thus, by increasing the content of Co in the binder phase as described above, effects of suppressing the deformation and the reduction in performance can be demonstrated.

In a laminate of the cemented carbide and the cermet, the liquid phase movement is likely to occur during sintering due to differences of the compositions, and the reduction in performance or deformation due to the liquid phase movement is likely to occur. However, when the difference between the content of the binder phase in the cermet layer and the content of the binder phase of the cemented carbide layer is small, the amount of liquid phase movement can be reduced and degradation of the properties associated with the liquid phase movement can be reduced. Specifically, when the content of the binder phase in the cemented carbide layer is defined as y1 (volume %) and the content of the binder phase in the cermet layer is defined as y2 (volume %), it is preferable that y1/y2 be in the range of 0.8 or more and 1.2 or lower. When y1/y2 is lower than 0.8 and more than 1.2, the liquid phase movement is likely to occur from the layer in which the amount of the binder phase is large to the layer in which the amount of the binder phase is small. Moreover, when Cr is added to the cemented carbide layer as described above, the liquid phase movement can be suppressed.

<<Other Contents>>

Similarly as the cemented carbide, the cermet layer may contain elements, such as Cr, Ta, Nb, Zr, V, or Mo or compounds, such as (Ta, Nb)C, VC, $Cr_2C_3$, or NbC. The content thereof is preferably 5 to 50 mass % in total. In the cermet layer, the remaining portion except the binder phase and impurities constitutes the hard phase. The composition of the raw material powder is designed so that the cermet layer has a desired composition.

<Production Method>

The composite material of the invention having a concave portion at the boundary between both the layers can be produced by preparing a raw material powder constituting each layer, mixing the powders, granulating the powders by a granulating device to obtain granulated powders, successively supplying the granulated powders to a metal die so that a desired lamination structure is obtained, pressing the resultant by a punch to form a green compact having the lamination structure, and sintering the green compact. The green compact can be formed by charging all the raw material powders in a metal die, performing (main) press or performing pre-press every time when the powder is supplied to the metal die, and then performing main press after all the raw material powders are supplied.

When performing only the main press, the number of press is small and the productivity becomes excellent. In this case, for example, when the raw material powders are granulated into a given size (e.g., 10 to 200 μm), the raw material powders are pressurized at a given pressure using a flat punch whose pressurizing surface is flat, and then sintered, a sintered compact having a concave-convex shape approximately corresponding to the size and shape of the granulated particles at the boundary between the cemented carbide layer and the cermet layer is obtained. In the sintered compact, the shape of the boundary and the outer shape of the cemented carbide layer at the surface side (surficial layer comprising cemented carbide) are not similar. The depth of the concave portion at the boundary can be changed by, for example, adjusting the properties of the granulated powder, such as the granulated grain size or the hardness, density, or shape of the granulated powder, pressing pressure, or the like. Or, by simultaneously pressurizing the raw material powders of both the layers using, for example, a punch having irregularities on a pressurizing surface, a green compact can be formed in which both the boundary and the outer shape have a concave-convex shape following the shape of the punch. When the surficial layer comprising cemented carbide is thin, the shape of the boundary is likely to follow the shape of the punch. In this case, the depth of the concave portion at the boundary can be changed by, for example, adjusting the depth of the convex, the pressing pressure, etc., of the punch. When the green compact is sintered, a composite material of the invention is obtained in which the shape of the boundary and the outer shape of the surficial layer comprising cemented carbide are similar to each other. The pressure during pressurizing is preferably 0.5 t/cm$^2$ or more and 2.5 t/cm$^2$ or lower. When the pressure is lower than 0.5 t/cm$^2$, the density of the green compact is low, and the shrinkage amount during sintering becomes large, and thus the accuracy of dimension is likely to decrease. When the pressure exceeds 2.5 t/cm$^2$, the green compact is excessively dense and cracks are likely to form. Particularly in the case of a complicated-shaped green compact, the formation of cracks more frequently occurs.

When performing the prepress, the irregularities at the boundary can be formed with a higher accuracy. For example, when the prepress is performed using the punch having irregularities and the main press is performed by the flat punch whose pressurizing surface is flat, a composite material of the invention is obtained in which the shape of the boundary and the outer shape of the surficial layer comprising cemented carbide are not similar to each other. Or, for example, when both the prepress and main press are performed using a punch having irregularities of the same shape, a composite material of the invention is obtained in which both the shape of the boundary and the outer shape of the surficial layer comprising cemented carbide have a concave-convex shape and are approximately similar to each other. When both the prepress and main press are performed using punches having irregularities of different shapes, a composite material of the invention is obtained in which both the shape of the boundary and the outer shape of the surficial layer comprising cemented carbide have a concave-convex shape and are not similar to each other. Or, when the prepress is performed using the flat punch so that the bonding interface is flattened once, and then the main press is performed using the punch having irregularities, the irregularities at the interface can be made small. The pressure of the prepress is preferably 0.1 t/cm² or more and 1.0 t/cm² or lower. When the pressure of the prepress is lower than 0.1 t/cm², sufficient pressure is not applied to the bonding interface, and thus the bonding interface is difficult to be flattened or desired irregularities are difficult to form. When the pressure of the prepress exceeds 1.0 t/cm², the bonding interface is excessively dense and thus the bonding ability of the boundary is likely to decrease. When the prepress is performed using the flat punch, and then the prepress is further performed using the punch having irregularities, the formation accuracy of the concave portion is further increased.

The depth of irregularities present at the boundary changes due to various factors, such as the properties (size, density, etc.) of the granulated powder, presence of prepress, pressure of prepress, thickness of the cemented carbide layer, or pressure of main press, as described above. In the composite material of the invention, the bonding ability can be increased by controlling these factors to provide a given concave-convex shape at the boundary.

A green compact having an enclosed structure can be formed using, for example, a metal die 60 in which a metal die body 61, an outer metal die 62, and an inner metal die 63 are concentrically disposed as shown in FIG. 3(I). Specifically, for example, the inner metal die 63 is lowered as shown in FIG. 3(II), powder is supplied to a space formed by the outer metal die 62 and the inner metal die 63, prepress is performed using a punch 64 as shown in FIG. 3(III), the outer metal die 62 is lowered as shown in FIG. 3 (IV), powder is supplied to a space between a prepressed article and the metal die body 61 so that the lamination surface of the prepressed article is entirely covered with powder, and main press is performed using the punch 64. For the prepress, a punch having a size corresponding to the size of the inner metal die 63 may be used and for the main press, a punch having a size corresponding to the size of the metal die body 61 may be used, and a concentric punch may be used similarly as the metal die. The green compact having a concentric structure can be formed using, for example, a metal die that can partially cover the lamination surface of the prepressed article (e.g., outer metal die having a [ shaped cross section or an outer metal die formed of a pair of plate materials disposed facing each other) in the above-described process. The formation method of the green compact having the two-layer structure or the three-layer structure described above will be described in embodiments described later.

The above-described sintering achieves both the formation of a sintered compact and integrally bonding of the cemented carbide layer and the cermet layer. For the sintering, general conditions can be utilized. For example, as the sintering conditions, holding at 1300 to 1500° C. in vacuum atmosphere for 0.5 to 3.0 hours is mentioned.

<Application>

The composite material of the invention has the properties of both the cemented carbide layer and the cermet layer and has high toughness and excellent wear resistance. Therefore, the composite material of the invention can be suitably utilized for materials that are desired to have excellent wear resistance and high toughness, e.g., base materials of cutting tools, such as a drill, an end mill, a cutting edge exchange type tip for milling processing, a cutting edge exchange type tip for turning, a metal saw, a gear cutting tool, a reamer, or a tap.

A coated cutting tool having a coated film on the base surface may be acceptable. Here, the base containing cermet generally has low adhesiveness with a coated film. In contrast, the base containing the composite material of the invention can improve the adhesiveness with the coated film by providing the cemented carbide layer. The coated film is preferably disposed at least on the cutting edge and the vicinity thereof. As the composition of the coated film, at least one element selected from elements of Groups IVa, Va, and VIa of the Periodic Table and Si and Al, compounds containing at least one element selected from carbon (C), nitrogen (N), oxygen (O), and boron (B), and substances containing at least one selected from diamond, diamond-like carbon (DLC), and cubic boron nitride (cBN) are mentioned, for example. More specifically, one or more members of carbides, nitrides, oxides, borides of elements, such as the metals mentioned above, and substances containing solid solutions thereof, e.g., TiCN, $Al_2O_3$, TiAlN, TiN, AlCrN, TiSiN, diamond, DLC, and cBN, are mentioned. A coated cutting tool having one or more layers of films selected from the above-described candidates can further improve the wear resistance as compared with the state where the coated film is not provided. The coated film may be a monolayer film or a multilayer film, and the total film thickness is preferably 1 to 20 μm. When formed by the PVD method, the total film thickness is more preferably 1 to 10 μm. The thickness of the coated film is changed by adjusting the film forming time.

For the formation of the coated film, both the PVD method and the CVD method can be utilized. For example, when an arc ion plating method is utilized as the PVD method, the film forming conditions of the base temperature: 400 to 600° C., the pressure of the atmosphere: 0.5 to 5 Pa, and, the bias voltage: −50 to −150V are mentioned. For example, when a thermal CVD method is utilized as the CVD method, the film forming conditions of the base temperature: 800 to 1000° C., the gas pressure: 5 to 10 MPa, and the reactive gas: $CH_4$, $H_2$, $N_2$, $CO_2$, $AlCl_3$, $TiCl_4$, etc., are mentioned. For the film forming conditions, known conditions can be used.

When a film of a Ti compound is formed by the CVD method, it is considered that it is preferable to increase the amount of Co in the binder phase of the cermet layer. This is because when Ni is contained in a high proportion in the cermet layer, Ni may have a bad influence on the performance of the film. In contrast, when a film is formed by the PVD method, a sharp cutting edge is easily obtained because the film obtained by the PVD method is thinner than the film obtained by the CVD method. Moreover, the film surface roughness of the film obtained by the PVD method is easily reduced than the film obtained by the CVD method. Therefore, even when a thin film obtained by the PVD method is formed on the base that is not subjected to the cutting edge treatment described above, the wear resistance can be increased, the surface roughness is small, and the processing accuracy is excellent. Furthermore, when the PVD film is formed on the base that is subjected to a cutting edge treatment having a cutting edge width as small as 0.05 mm or lower, chipping of the cutting edge can be effectively suppressed while maintaining the processing accuracy to some extent.

Advantages

The composite material of the invention has excellent bonding ability between the cemented carbide layer and the cermet layer and is difficult to deform even after sintering. The coated cutting tool of the invention having a base containing such a composite material is excellent in both the wear resistance and toughness and the tool life is long.

BRIEF DESCRIPTION OF DRAWINGS

FIGS. 1(I) and 1(II) show composite materials in which the boundary shape and the outer shape of the cemented carbide layer are similar to each other. FIG. 1(III) shows a composite material in which the boundary shape and the outer shape of the cemented carbide layer are not similar to each other.

FIG. 3(I) is a schematic view of a top surface of a metal die. FIG. 3(II) shows that an inner metal die is lowered. FIG. 3(III) shows that powder is supplied to a space formed with the inner metal die and an outer metal die. FIG. 3(IVI) shows that the outer metal die is lowered and powder is supplied.

FIGS. 4(I) to 4(III) are view for describing a production process of a composite material having concave portions at the boundary between a cemented carbide layer and a cermet layer. FIG. 4(I) shows that a powder for cermet is charged in a metal die. FIG. 4(II) shows that the charged powder for cermet is pressurized by a punch having irregularities. FIG. 4(III) shows that a powder for cemented carbide is charged on the powder for cermet. FIGS. 4(V) and 4(IV) are cross-sectional schematic views of the obtained composite material. FIG. 4(IV) shows a composite material having a concave portion. FIG. 4(V) shows a composite material not having a concave portion.

Figure 1:
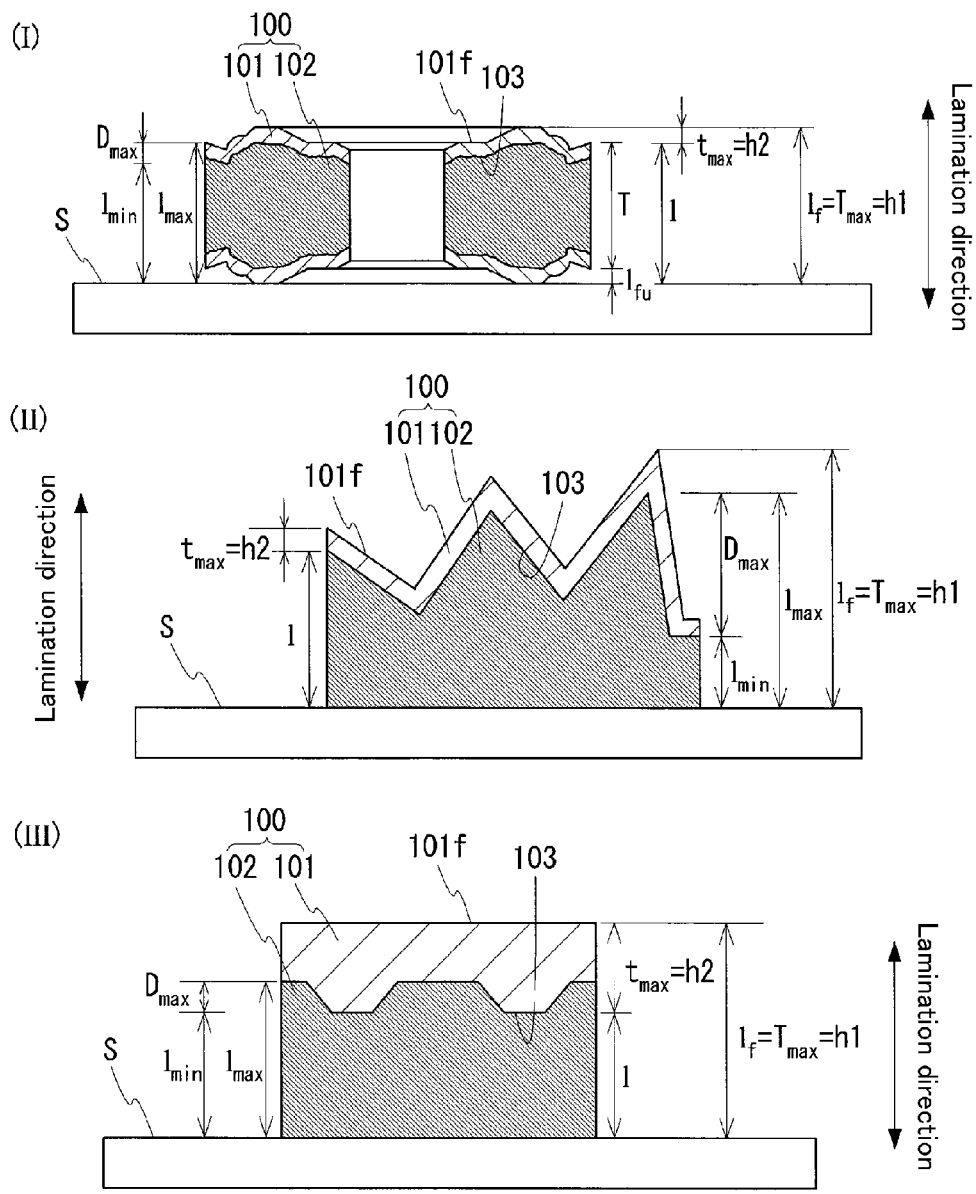
FIG. 1 is a schematic view for describing a method for measuring, in a composite material having a concave portion at the boundary between a cemented carbide layer and a cermet layer, the maximum depth of the concave portion, the thickness of the composite material, and the thickness of the cemented carbide layer.

REFERENCE NUMERALS $10_{ii}$, $10_{iii}$ composite material
11 cemented carbide layer
12 cermet layer
13 boundary
14 attachment hole
20a, 20b laminated green compact
21 powder for cemented carbide
22 powder for cermet
23 concave portion
50, 60 metal die
51 flat punch
52 punch having irregularities
61 metal die body
62 outer metal die
63 inner metal die
64 punch
100 composite material
101 cemented carbide layer
101f surface
102 cermet layer
103 boundary
S reference surface
200 edge line
201 flank face
202 rake face
203 intersection

BEST MODES FOR CARRYING OUT THE INVENTION

Test Example 1

Composite materials in which a cemented carbide layer and a cermet layer were laminated were produced, and the separation state of the cemented carbide layer after sintering and the deformation state of the composite materials were analyzed.

The composite materials were produced as follows. Raw material powders were weighed so that the composition shown in Table I is achieved, and the raw material powders were mixed in ethanol for 11 hours by an attritor (ATR) and then granulated, thereby obtaining a powder for cemented carbide having an average grain size of 100 μm (granulated powder) and a powder for cermet having an average grain size of 100 μm (granulated powder). The measurement of the average grain size of the granulated powders was performed by image analysis of SEM (scanning electron microscope) photographs of the powders but can also be performed using a grain size analyzer or the like. The obtained powder for cemented carbide and the powder for cermet were weighed out so that a cemented carbide layer and a cermet layer have desired thicknesses. In Tables I and IV shown later, the "Cr proportion" in the cemented carbide indicates Ratio of Content of Cr ×2 (mass %) to Content of Binder phase (here mainly Co) ×1 (mass %): ×2/×1 (no unit). The "Co proportion" in the cermet indicates the content (mass %) of Co relative to 100 mass % of the binder phase (here mainly Co+Ni).

TABLE I

Cemented carbide (mass %)

| WC | Co | Cr Content | Cr proportion |
|---|---|---|---|
| 89.4 | 10 | 0.6 | 0.06 |

Cermet (mass %)

| TiCN | WC | Mo$_2$C | Co Content | Co proportion | Ni |
|---|---|---|---|---|---|
| 40 | 37 | 5 | 16 | 88.9 | 2 |

Figure 4:
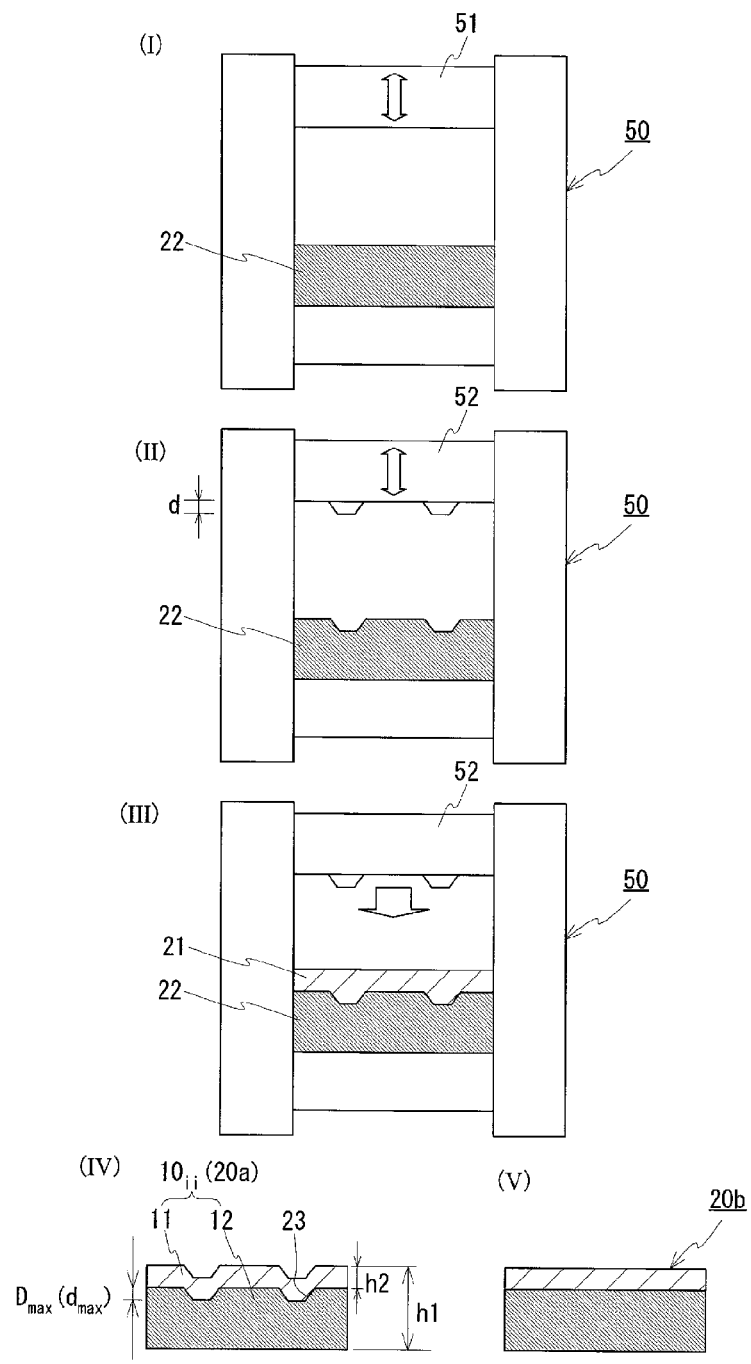

Average grain size of WC powder of cemented carbide layer: 0.8 μm
Average grain size of WC powder of cermet layer: 3 μm
Average grain size of TiCN powder: 3 μm
Average grain side of Mo$_2$C powder: 3 μm Laminated green compacts are produced using the obtained powder for cemented carbide and the obtained powder for cermet. In this test, a produced powder for cermet 22 was supplied to a metal die 50 having a space having a rectangular cross section shown in FIG. 4, and prepress was performed by pressurizing the powder 22 at a pressure of 0.5 t/cm$^2$ using a flat punch 51 shown in FIG. 4(I) or a punch 52 having irregularities shown in FIG. 4 (II), and then a powder for cemented carbide 21 is supplied as shown in FIG. 4 (III). Then, main press is performed at a pressure of 1.0 t/cm$^2$ using the flat punch 51 or the punch 52 having irregularities, thereby producing laminated green compacts 20*a* (samples Nos. 1-1 to 1-6) having a two-layer structure and a laminated green compact 20*b* (sample No. 100) shown in FIGS. 4(VI) and 4(V). In the samples Nos. 1-1 to 1-6, the maximum depth d$_{max}$ of concave portions 23 was varied using the punch 52 having several irregularities different in the size d of each of the concave and convex portions. Here, the green compacts 20*a* have two concave portions on the cross section.

When the depth of the irregularities (here 50 μm or lower), prepress for leveling using the flat punch 51 was performed, and then prepress using the punch 52 having irregularities was performed again. However, when the depth of the irregularities is large, leveling is not required to be performed. A green compact may be formed by supplying the powder for cemented carbide, and then supplying the powder for cermet. These respects are similarly applied to Test Example 9 described later.

The obtained laminated green compacts were sintered under the conditions of 1430° C.×60 min in vacuum atmosphere, thereby obtaining composite materials 10$_{ii}$ having a two-layer structure having a cemented carbide layer 11 and a cermet layer 12 shown in FIG. 4(IV). All the composite materials have the cemented carbide layer 11 in such a manner as to entirely cover one surface of the square pole-like cermet layer 12. In all the composite materials, the thickness h1 in the lamination direction is 4.76 mm and the thickness h2 in the lamination direction of the cemented carbide layer is 476 μm (h2/h1=0.1). Here, the thickness of the cemented carbide layer is thoroughly approximately uniform and may be partially different. The thickness h1 of the composite material was measured using a height gauge and the thickness h2 of the cemented carbide layer was measured using an observation image obtained by observing the cross section of the composite materials under a microscope (×500). When the amount of the binder phase at a 100 μm point from the boundary between both the layers is measured using EPMA in the composite materials, the binder phase amount y1 of the cemented carbide layer is 16.2 volume %, the binder phase amount y2 of the cermet layer is 15.3 volume %, and y1/y2 is 1.0. The Cr amount in the cemented carbide layer and the Co amount in the cermet layer are measured in the same manner as in the amount of the binder phase, and then the Cr proportion and the Co proportion are determined. For the measurement, EDX may be used in addition to EPMA. The total content of W and WC in the cermet layer is measured to be 36.3 mass %. The W amount is measured similarly as the Co amount and the WC amount is measured at a 100-μm point from the boundary between both the layers using EPMA and XRD. Then, the total of the amounts is defined as the total content of W and WC. All the measurement values are average values. The average grain size of the WC of the cemented carbide layer is measured to be 0.9 μm. As the average grain size, the cut surface of the composite material is wrapped, crystal analysis thereof is performed by SEM, analysis images are captured into an image analyzer and analyzed, the grain size (μm) of crystal grains of WC particles at the cut surface is measured, and the average value thereof is used. When the structure of the cermet layer was observed by SEM for the obtained composite material, TiCN particles, black core-particles, and white core-particles were present as hard phase particles.

For the obtained composite materials, the maximum depth (the depth of irregularities) D$_{max}$ of the concave portions was measured and the presence of separation of the cemented carbide layer and the presence of deformation of the composite material were analyzed. The results are shown in Table II. The maximum depth D$_{max}$ of the concave portion was measured using a microscope observation image (×500) of the cut surface of the composite material. The separation state is observed under a microscope or visually observed. Then, the composite material in which, at the bonding interface between the cemented carbide layer and the cermet layer, at least one portion of the cemented carbide layer does not bond with the cermet layer and is separated therefrom or the cemented carbide layer is partially chipped is evaluated as C, the composite material having no chipping or separation but having slight cracks is evaluated as B, the composite material having no separation, chipping, and cracks is evaluated as A. The deformation state is evaluated as follows. Each sample is disposed on a level stand with the cemented carbide layer facing above, the entire surface except the concave portions is measured with a height gauge, a difference (degree of curvature) between the highest position and the lowest position of the surface is calculated, and the difference of more than 0.1 mm is evaluated as C and the difference of 0.1 mm or lower is evaluated as A.

TABLE II

| Sample No. | Depth of irregularities (μm) | Presence of separation after sintering | Presence of deformation after sintering |
|---|---|---|---|
| 100 | 0 | C | A |
| 1-1 | 30 | C | A |
| 1-2 | 50 | A | A |
| 1-3 | 150 | A | A |
| 1-4 | 350 | A | A |
| 1-5 | 400 | A | A |
| 1-6 | 1000 | A | C |

Table II shows that as the maximum depth (the depth of irregularities) of the concave portion becomes large, the cemented carbide layer is difficult to separate. However, it is revealed that when the maximum depth thereof is excessively large, deformation occurs. This test shows that when the maximum depth of the concave portion satisfies a given range, a composite material is obtained in which separation between the cemented carbide layer and the cermet layer is difficult to occur and deformation is small. It is considered that such a composite material can be suitably used for, for example, bases of cutting tools because the composite material can sufficiently make the most of the properties of both the cemented carbide layer and the cermet layer.

Test Example 2

Cutting tools containing a composite material produced in the same manner as in Test Example 1 were produced, and the cutting performance was analyzed. This test is performed in the same manner as in Test Example 1, except changing the composition (total content of W and WC) of the cermet layer utilized in Test Example 1 (Composition of the cemented carbide layer being the same as that of Test Example 1). By changing the addition amount of WC used as a raw material, the total content of W and WC of the cermet layer was changed as shown in Table V. The addition amount of a raw material TiCN is increased/decreased in accordance with an increase/decrease of the addition amount of the raw material WC so that the total amount of TiCN and WC is the same as that of Test Example 1. The measurement of the amount of W and the amount of WC in the cermet layer was performed in the same manner as in Test Example 1.

Figure 2:
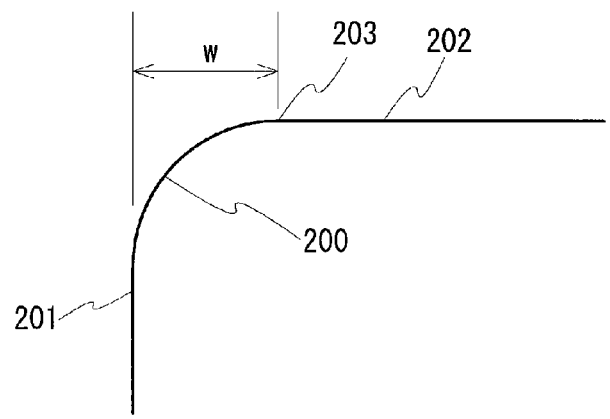
FIG. 2 is a schematic view for describing a method for measuring the amount of cutting edge treatment.
Figure 3:
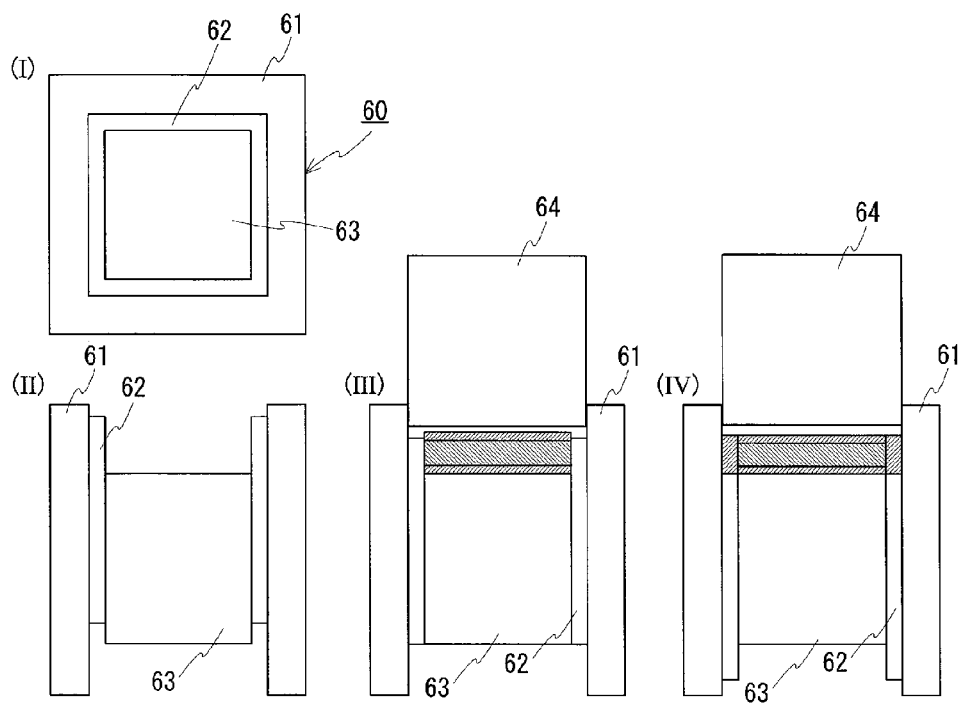
FIG. 3 is a view for describing a production process of a composite material having an enclosed structure.
Figure 5:
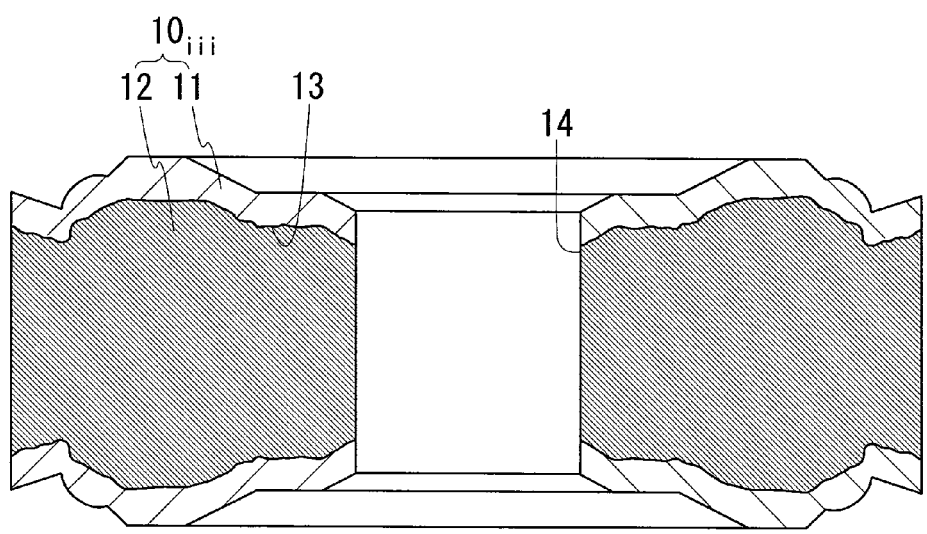
FIG. 5 is a composite material having concave portions at the boundary between a cemented carbide layer and a cermet layer and is a cross-sectional schematic view showing one having a three-layer structure.

The composite material used in this test was produced using a metal die having a given shaped so that Sumitomo Electric Industries, Ltd., Model No.: SNMG120408N-UX (throw away tip) (trade name) was obtained. Moreover, in this test, as shown in FIG. 5, a composite material $10_{iii}$ having a three-layer structure in which a pair of cemented carbide layers 11 are disposed in such a manner as to sandwich one cermet layer 12 therebetween was produced. The composite material $10_{iii}$ was produced by successively supplying a powder for cemented carbide, a powder for cermet, and a powder for cemented carbide to a metal die, pressurizing the powders using a punch having irregularities at 1.0 t/cm² to form a laminated green compact, and sintering the obtained green compact under the same conditions as those of Test Example 1. At a boundary 13 of the obtained composite material, irregularities following the shape of the punch or irregularities (concave portions) not following the shape of the punch are observed as shown in FIG. 5. In the composite material, the thickness h1 is 4.76 mm, the thickness h2 of the cemented carbide layer is 476 μm (h2/h1=0.1), the maximum depth $D_{max}$ of the concave portion is 200 μm, the average grain size of the WC particles of the cemented carbide layer is 0.9 μm, the Cr proportion of the cemented carbide layer is 0.06, and the Co proportion of the cermet layer is 88.9 mass %. The binder phase amount ratio y1/y2 of both the layers of the composite material is analyzed in the same manner as in Test Example 1, all the samples satisfy y1/y2: 0.8 to 1.2. The edge line formed with the cemented carbide layer of the composite material is partially subjected to cutting edge treatment (Cutting edge treatment width w (refer to FIG. 2): 0.04 mm) to be formed into a cutting tool. The rake face of the cutting tool is formed with the cemented carbide layer and the flank face is formed with a lamination surface of the cemented carbide layer and the cermet layer. At the center of the cutting tool, an attachment hole 14 for attaching the cutting tool to a tool body (not shown) is provided.

A cutting test (turning processing) was performed using the obtained cutting tools under the cutting conditions shown in Table III, and the toughness (breakage resistance) was analyzed. The results are shown in Table IV. The toughness was evaluated based on the number of times of impacts applied until the tool was broken. Samples in which the toughness was evaluated as "C" were not subjected to the cutting test because the separation of the cemented carbide layer occurred after sintering. Moreover, the obtained tools were analyzed for the separation state of the cemented carbide layer. The results are also shown in Table IV. The evaluation of the separation state is the same as that of Test Example 1.

TABLE III

| Cutting conditions | |
| --- | --- |
| v m/min | 100 |
| f mm/rev. | 0.2 |
| d mm | 2 |
| Time (pass) | 30 sec |
| Work | SCM435-4 groove |
| Presence of lubricant | dry |
| Tip shape | SNMG120408N-UX |

TABLE IV

| Sample No. | Amount of W and WC (mass %) | Presence of separation after sintering | Breakage resistance number of impacts (times) |
| --- | --- | --- | --- |
| 2-1 | 5 | C | C |
| 2-2 | 10 | B | C |
| 2-3 | 20 | A | 3323 |
| 2-4 | 30 | A | 3258 |
| 2-5 | 40 | A | 3187 |
| 2-6 | 60 | A | 3095 |
| 2-7 | 70 | A | 2711 |

Table IV shows that as the total content of W and WC contained in the cermet layer increases, the separation is difficult to occur. However, it is revealed that when the content of W and WC is excessively high, the toughness is likely to decrease. This is because it is considered that the difference in the thermal expansion coefficient between the cemented carbide layer and the cermet layer became small due to that the total content of W and WC excessively increased in the tool, and thus the compression stress introduced into the cemented carbide layer became small. As the addition amount of the raw material WC increased, the precipitation of the WC or white core-particles was observed in the cermet layer.

Test Example 3

Cutting tools containing a composite material having a three-layer structure produced in the same manner as in Test Example 2 and coated cutting tools having a base containing the composite material were produced. Then, the cutting tools and the coated cutting tools were analyzed for the separation state of the cemented carbide layer after sintering and cutting performance. This test is performed in the same manner as in Test Example 2, except changing the thickness of the cemented carbide layer of the cutting tool (base) produced in Test Example 2 (Thickness h1: 4.76 mm, Maximum depth $D_{max}$: 200 μm, Sumitomo Electric Industries, Ltd., Model No.: SNMG120408N-UX (trade name), and Cutting edge treatment width: 0.04 mm) The composition of the cutting tool (base) is the same as that of Test Example 1 (Binder phase amount ratio y1/y2: 1.0, Average grain size of the WC particles of the cemented carbide layer: 0.9 μm, Total content of W and WC of the cermet layer: 36.3 mass %, Cr proportion of the cemented carbide layer: 0.06, and Co proportion of the cermet layer: 88.9 mass %). For comparison, a cutting tool (base) not having a cemented carbide layer, i.e., a cutting tool containing only cermet (thickness h1: 4.76 mm), was produced.

A coated film is formed on the obtained base by the PVD method (here, an arc ion plating method) as follows, and a coated cutting tool is produced. Argon gas is introduced into a chamber of a film forming device, the pressure in the chamber is maintained at 3.0 Pa, the base bias voltage is adjusted to −1000V, the base surface is cleaned for 30 minutes utilizing a tungsten (W) filament, the argon gas is discharged from the chamber, and successively a film is formed. The film formation is performed by adjusting the base temperature to a given temperature, and evaporating a cathode substance from an evaporation source by arc discharge between the evaporation source and the chamber in a vacuum state or while introducing, as a reactive gas, one or more kinds of gas of nitrogen, methane, and oxygen. In this test, a coated film (two layers) of the composition shown in Table V was formed. As the film forming conditions, the base temperature was adjusted to 500° C., the bias voltage was adjusted to −100 V, and the pressure of the atmosphere was adjusted to 1.5 Pa.

TABLE V

|  | Base side | Surface side |
|---|---|---|
| Composition | TiN | TiAlN |
| Thickness (μm) | 0.5 | 2.5 |

Cutting tests (turning processing in every case) were performed using the obtained cutting tools and the obtained coated cutting tools (PVD) under the cutting conditions shown in Table VI, and the wear resistance and toughness (breakage resistance) were analyzed. The results are shown in Table VII. The evaluation of the toughness is the same as that of Test Example 2. The wear resistance was evaluated by measuring the wear amount of the flank face (mm) after 30 minutes passed. The obtained cutting tools were analyzed for the separation state of the cemented carbide layer. The results are shown in Table VII. The evaluation of the separation state is the same as that of Test Example 1. In Table VII and Table XVIII shown later, the numerical value in [ ] next to the thickness (μm) of the cemented carbide layer indicate the ratio of the thickness h2 of the cemented carbide layer to the thickness h1 of the cutting tool or the base.

TABLE VII

| Cutting tool (without coated film) | | |
|---|---|---|
| Sample No. | Thickness of cemented carbide layer (μm) [h2/h1] | Presence of separation after sintering |
| 300 | None [0] | — |
| 3-1 | 50 [0.01] | A |
| 3-2 | 100 [0.021] | A |
| 3-3 | 200 [0.042] | A |
| 3-4 | 300 [0.063] | A |
| 3-5 | 500 [0.105] | A |
| 3-6 | 1000 [0.21] | A |
| 3-7 | 2000 [0.42] | C |

| Coated film cutting tool (PVD) | | | |
|---|---|---|---|
| Sample No. | Thickness of cemented carbide layer (μm) [h2/h1] | Breakage resistance Number of impacts (times) | Wear resistance Wear amount (mm) |
| 301 | None [0] | 3162 | 0.19 |
| 3-11 | 50 [0.01] | 3395 | 0.17 |
| 3-12 | 100 [0.021] | 3847 | 0.19 |
| 3-13 | 200 [0.042] | 4171 | 0.18 |
| 3-14 | 300 [0.063] | 4356 | 0.17 |
| 3-15 | 500 [0.105] | 4418 | 0.19 |
| 3-16 | 1000 [0.21] | 4380 | 0.17 |
| 3-17 | 2000 [0.42] | Test is not performed due to the separation of the cemented carbide layer during sintering. | |

| Cutting tool (without coated film) | | | |
|---|---|---|---|
| Sample No. | Thickness of cemented carbide layer (μm) [h2/h1] | Breakage resistance Number of impacts (times) | Wear resistance Wear amount (mm) |
| 302 | None [0] | 1952 | 0.23 |
| 3-21 | 50 [0.01] | 2294 | 0.22 |
| 3-22 | 100 [0.021] | 2889 | 0.21 |
| 3-23 | 200 [0.042] | 3065 | 0.22 |
| 3-24 | 300 [0.063] | 3187 | 0.23 |
| 3-25 | 500 [0.105] | 3113 | 0.21 |
| 3-26 | 1000 [0.21] | 3274 | 0.2 |
| 3-27 | 2000 [0.42] | Test is not performed due to the separation of the cemented carbide layer during sintering. | |

Table VII shows that even when a concave portion having a given maximum depth is provided, the separation occurred depending on the thickness of the cemented carbide layer. It is also revealed that, by providing the cemented carbide layer, the toughness is improved. Furthermore, the base in the coated cutting tool was excellent in adhesiveness with the PVD film. This is because it is considered that the adhesiveness improved by providing the cemented carbide layer to the base. It is also revealed that even when the coated film is not

TABLE VI

| | Breakage resistance | | Wear resistance | |
|---|---|---|---|---|
| Cutting conditions | Without coated film | With coated film | Without coated film | With coated film |
| v m/min | 100 | 100 | 100 | 200 |
| f mm/rev. | 0.2 | 0.3 | 0.3 | 0.3 |
| d mm | 2.0 | 2.0 | 1.5 | 1.5 |
| Time (pass) | 30 sec | 30 sec | 30 min | 30 min |
| Work | SCM435-4 groove | SCM435-4 groove | SCM435 | SCM435 |
| Presence of lubricant | dry | dry | dry | dry |
| Tip shape | SNMG120408N-UX | SNMG120408N-UX | SNMG120408N-UX | SNMG120408N-UX | provided, excellent cutting performance is imparted, the cutting performance can be further improved by providing the PVD film.

Test Example 4

Coated cutting tools having a base containing a composite material having a three-layer structure produced in the same manner as in Test Example 2 were produced, and the cutting performance was analyzed. This test is performed in the same manner as in Test Example 2, except changing the Co proportion of the cermet layer of the cutting tool (base) produced in Test Example 2 (Composition of the cemented carbide layer: same as that of Test Example 1, Thickness h1: 4.76 mm, Maximum depth $D_{max}$: 200 µm, Sumitomo Electric Industries, Ltd., Model No.: SNMG120408N-UX (trade name), Cutting edge treatment width: 0.04 mm, Average grain size of WC of the cemented carbide layer: 0.9 µm, Total content of W and WC of the cermet layer: 36.3 mass %, and Cr proportion of the cemented carbide layer: 0.06). The thickness h2 of the cemented carbide layer is 476 µm (h2/h1=0.1). The content of Ni is increased/decreased in accordance with an increase/decrease of the content of Co so that the total amount of the binder phases is the same as that of Test Example 1. By changing the amount of Co used as a raw material, the amount of Co in the binder phase of the cermet layer was changed as shown in Table IX. The Co proportion in Table IX is based on 100 mass % of the amount of iron-group metals in the binder phase of the cermet layer. The amount of iron-group metals and the amount of Co were similarly measured using EPMA in the same manner as in the measurement of the amount of the binder phase of Test Example 1. When the binder phase amount ratio y1/y2 of both the layers of the base was analyzed in the same manner as in Test Example 1, all the sample were in the range of 0.8 to 1.2.

A coated film (three-layer) having the composition shown in Table VIII was formed on the obtained base under known conditions by a CVD method (here a thermal CVD method), thereby producing coated cutting tools (CVD). A cutting test was performed using the obtained coated cutting tool under the cutting conditions of "With coated film" shown in Table VI, and the wear resistance and toughness (breakage resistance) were analyzed. The results are shown in Table IX. The evaluation methods of the wear resistance and the toughness are the same as that of Test example 3.

TABLE VIII

| | Base side | → | Surface side |
|---|---|---|---|
| Composition | TiN | TiCN | Al$_2$O$_3$ |
| Thickness (µm) | 0.5 | 4.5 | 5 |

TABLE IX

| Sample No. | Co proportion of cermet layer | Wear resistance Wear amount (mm) | Breakage resistance Number of impacts (times) |
|---|---|---|---|
| 4-1 | 0% | 0.25 | 2532 |
| 4-2 | 50% | 0.23 | 2681 |
| 4-3 | 80% | 0.2 | 3617 |
| 4-4 | 90% | 0.2 | 3974 |
| 4-5 | 100% | 0.19 | 4136 |

Table IX shows that the Co proportion to the binder phase of the cermet layer becomes high, the toughness is excellent. It is also revealed that the wear resistance is excellent. This is because it is considered that, by reducing Ni to suppress the liquid phase movement, deformation is prevented and a reduction in hardness is reduced, and as a result the wear resistance is improved. In this test, although the CVD film was formed, the adhesiveness between the base and the coated film is excellent by providing the cemented carbide layer to the base.

Test Example 5

Coated cutting tools having a base containing a composite material having a three-layer structure produced in the same manner as in Test Example 2 were produced, and the cutting performance was analyzed. This test is performed in the same manner as in Test Example 2, except changing the cutting edge treatment width of the cutting tool (base) produced in Test Example 2 (Thickness h1: 4.76 mm, Maximum depth $D_{max}$: 200 µm, Sumitomo Electric Industries, Ltd., Model No.: SNMG120408N-UX (trade name), Average grain size of WC of the cemented carbide layer: 0.9 µm, Total content of W and WC of the cermet layer: 36.3 mass %, Cr proportion of the cemented carbide layer: 0.06, and Co proportion of the cermet layer: 88.9 mass %). The composition of the base is the same as that of Test Example 1 (binder phase amount ratio y1/y2: 1.0 of both the layers) and the thickness h2 of the cemented carbide layer is 476 µm (h2/h1=0.1).

A coated film (PVD film) having the same composition and thickness as those of Test Example 3 was formed on the obtained base by an arc ion plating method under the same conditions same as those of Test Example 3, thereby producing coated cutting tools. Then, cutting tests (turning processing in every case) were performed under the cutting conditions shown in Table X, and the toughness (breakage resistance) and the burr state of the work were analyzed. The results are shown in Table XI. The evaluation method of the toughness is the same as that of Test Example 2. The burr state of the work was evaluated by measuring the height of the burr occurring in the work as follows: Burr height of 1 mm or lower: A, Burr height of more than 1 mm and 1.5 mm or lower: B, and Burr height of more than 1.5 mm: C.

TABLE X

| Cutting conditions | Burr state | Breakage resistance |
|---|---|---|
| v m/min | 170 | 100 |
| f mm/rev. | 0.35 | 0.3 |
| d mm | 1.5 | 2.0 |
| Time (pass) | 1 pass | 30 sec |
| Work | SCM435 | SCM435-4 groove |
| Presence of lubricant | dry | dry |
| Tip shape | SNMG120408N-UX | SNMG120408N-UX |

TABLE XI

| Sample No. | Cutting treatment width (mm) | Burr of work | Breakage resistance Number of impacts (times) |
|---|---|---|---|
| 5-1 | None | A | 3586 |
| 5-2 | 0.01 | A | 3868 |
| 5-3 | 0.02 | A | 4118 |
| 5-4 | 0.04 | A | 4395 |
| 5-5 | 0.06 | B | 4541 |
| 5-6 | 0.08 | C | 4487 |

Table XI shows that the toughness can be improved by performing cutting edge treatment. In particular, it is also revealed that the occurrence of burr can be suppressed due to that fact that a sharp cutting edge can be obtained by cutting edge treatment having a cutting edge treatment width as small as 0.05 mm or lower. By providing the cemented carbide layer to the base, the adhesiveness with the coated film is excellent. Moreover, by providing the PVD film to the base that is subjected to cutting edge treatment of 0.05 mm or lower, the toughness can be improved and excellent processing accuracy can be achieved.

Test Example 6

Coated cutting tools having a composite material having a three-layer structure were produced in the same manner as in Test Example 2, and the cutting performance was analyzed. This test is performed in the same manner as in Test Example 2, except changing the Cr content in the cemented carbide of the cutting tool produced in Test Example 2 (Composition of the cermet layer: same as that of Test Example 1, Thickness h1: 4.76 mm, Maximum depth $D_{max}$: 200 μm, Sumitomo Electric Industries, Ltd., Model No.: SNMG120408N-UX (trade name), Cutting treatment width: 0.04 mm, Average grain size of WC particles of the cemented carbide layer: 0.9 μm, Total content of W and WC of the cermet layer: 36.3 mass %, and Co proportion of the cermet layer: 88.9 mass %). The thickness h2 of the cemented carbide layer is 476 μm (h2/h1=0.1). By changing the addition amount of Cr used as a raw material, the content of Cr of the cemented carbide layer was changed as shown in Table XII. The addition amount of the raw material WC is increased/decreased in accordance with an increase/decrease of the addition amount of the raw material Cr so that the Co content was fixed (Co: 10 mass %). When the binder phase amount ratio y1/y2 of both the layers of the tool was analyzed in the same manner as in Test Example 1, all the sample were in the range of 0.8 to 1.2.

A cutting test was performed using the obtained cutting tools under the cutting conditions of "Without coated film" shown in Table VI, and the wear resistance and toughness (breakage resistance) were analyzed. The results are shown in Table XII. The evaluation methods of the wear resistance and the toughness are the same as those of Test Example 3. In Table XII, "x2/x1" indicates the ratio of the Cr content: x2 (mass %) to the content of the binder phase (Co) in the cemented carbide layer: x1 (mass %). The measurement of the Cr amount is performed using EPMA in the same manner as in Test Example 1.

TABLE XII

| Sample No. | Cr amount in cemented carbide layer Mass % | x2/x1 | Wear resistance Wear amount (mm) | Breakage resistance Number of impacts (times) |
|---|---|---|---|---|
| 6-1 | 0.1 | 0.01 | 0.29 | 3414 |
| 6-2 | 0.3 | 0.03 | 0.24 | 3324 |
| 6-3 | 0.5 | 0.05 | 0.21 | 3298 |
| 6-4 | 0.9 | 0.09 | 0.2 | 3286 |
| 6-5 | 1.2 | 0.12 | 0.22 | 3166 |
| 6-6 | 2 | 0.2 | 0.21 | 2912 |
| 6-7 | 2.5 | 0.25 | 0.22 | 2138 |

Table XII shows that when the Cr content in the cemented carbide layer (x2/x1) is in the range of 0.02 or more and 0.2 or lower, a reduction in the wear resistance due to that the WC particles become coarse or a reduction in the breakage resistance due to the precipitation of Cr or the like can be suppressed, and thus both the wear resistance and toughness are excellent. It is considered that deformation or a reduction in performance due to the liquid phase movement was also suppressed due to the fact that an appropriate amount of Cr is contained.

Test Example 7

Composite materials having a two-layer structure in which the amount of the binder phase in the cermet layer (volume %) was fixed and the amount of the binder phase in the cemented carbide layer (volume %) was changed were produced in the same manner as in Test Example 1. Then, the deformation state of the composite materials after sintering was analyzed. This test is performed in the same manner as in Test Example 1, except changing the amount of the binder phase in the cemented carbide layer (Thickness h1: 4.76 mm, Thickness of the cemented carbide layer h2: 476 μm (h2/h1=0.1), and Maximum depth $D_{max}$: 200 μm). The WC was increased/decreased in accordance with an increase/decrease in the binder phase of the cemented carbide layer.

The amount (volume %) of the binder phase near the boundary between the cemented carbide layer and the cermet layer relative to the obtained composite materials was measured. The measurement of the amount of the binder phase was performed by observing the cross section of the composite material under a microscope (×500), and performing line analysis of the 100 μm-position from the above-described boundary of the composite material using EPMA. Moreover, the deformation state was measured in the same manner as in Test Example 1 and was similarly evaluated. These results are shown in Table XIII.

TABLE XIII

| | Before sintering | | | After sintering | | | |
|---|---|---|---|---|---|---|---|
| Sample No. | Binder phase amount Y1 of cemented carbide layer (volume %) | Binder phase amount Y2 of cermet layer (volume %) | Y1/Y2 | Binder phase amount y1 of cemented carbide layer (volume %) | Binder phase amount y2 of cermet layer (volume %) | y1/y2 | Deformation |
| 7-1 | 9 | 15 | 0.6 | 10.3 | 14 | 0.7 | C |
| 7-2 | 12 | 15 | 0.8 | 12.4 | 14.8 | 0.8 | A |
| 7-3 | 15 | 15 | 1 | 14.9 | 15.2 | 1 | A |
| 7-4 | 19.5 | 15 | 1.3 | 18.4 | 15.4 | 1.2 | A |
| 7-5 | 22.5 | 15 | 1.5 | 21.6 | 16.4 | 1.3 | C |

Table XIII shows that as the difference in the amount of the binder phase between both the layers is small, the movement of the binder phase is small and the deformation is small.

Test Example 8

A coated film (PVD film) was formed in the same manner as in Test Example 3 on a base containing a composite material having a three-layer structure produced in the same manner as in Test Example 2, thereby producing coated cutting tools. Then, the cutting performance was analyzed. This test is performed in the same manner as in Test Example 2, except changing the size of the WC powder used for the cemented carbide layer of the cutting tool (base) produced in Test Example 2 (Thickness h1: 4.76 mm, Thickness h2: 476 μm (h2/h1=0.1), Maximum depth $D_{max}$: 200 μm, Sumitomo Electric Industries, Ltd., Model No.: SNMG120408N-UX (trade name), and Cutting treatment width: 0.04 mm) The composition of the cutting tool (base) is the same as that of Test Example 1 (Binder phase amount ratio y1/y2: 1.0, Total content of W and WC of the cermet layer: 36.3 mass %, Cr proportion of the cemented carbide layer: 0.06, and Co proportion of the cermet layer: 88.9 mass %).

The obtained base was analyzed for the average grain size of the cemented carbide layer. The results are shown in Table XIV. A cutting test was performed using the obtained coated cutting tools under the cutting conditions of "With coated film" shown in Table VI, and the wear resistance and toughness (breakage resistance) were analyzed. The results are shown in Table VIX. The average grain size was measured in the same manner as in Test Example 1. The evaluation methods of the wear resistance and the toughness are the same as that of Test example 3.

TABLE XIV

| Sample No. | WC average grain size of cemented carbide layer (μm) | Wear resistance Wear amount (mm) | Breakage resistance Number of impacts (times) |
|---|---|---|---|
| 8-1 | 0.5 | 0.17 | 4513 |
| 8-2 | 0.9 | 0.19 | 4368 |
| 8-3 | 1.3 | 0.21 | 4063 |
| 8-4 | 2 | 0.22 | 3925 |

Table XIV shows that samples in which the average grain size of WC in the cemented carbide layer is as small as 1.0 μm or lower have excellent wear resistance. It is also revealed that these samples have excellent toughness. This is because it is considered that the crystal grains near the boundary with the base in the PVD film were atomized following fine WC particles of the cemented carbide layer to increase the adhesiveness between the base and the PVD film, and thus the toughness was improved.

Test Example 9

Composite materials in which the cemented carbide layer and the cermet layer were laminated were produced in the same manner as in Test Example 1. Then, the separation state of the cemented carbide layer after sintering and the deformation state of the composite material were analyzed. This test is performed in almost the same manner, except that the grain size of the WC powder utilized for a raw material of the cemented carbide layer was changed and the composition of the cermet layer was changed in Test Example 1.

The composite materials were produced as follows. Raw material powders were weighed so that the composition shown in Table XV is achieved, and granulated powders having an average grain size of 100 μm were produced in the same manner as in Test Example 1. Using the obtained powder for cemented carbide and the obtained powder for cermet, laminated green compacts 20a (samples No. 9-1 to 9-6) and 20b (sample No. 900) having a two-layer structure shown in FIGS. 4(VI) and 4(V) are produced in the same manner as in Test Example 1. The maximum depth $d_{max}$ of the concave portions was varied using two or more punches different in the size of each of the concave and convex portions in the same manner as in Test Example 1.

TABLE XV

| Cemented carbide (mass %) | | | |
|---|---|---|---|
| | | | Cr |
| WC | Co | Content | Cr proportion |
| 89.4 | 10 | 0.6 | 0.06 |

| Cermet (mass %) | | | | | | | | |
|---|---|---|---|---|---|---|---|---|
| | | | | | | | Co | |
| TiCN | WC | (Ti, W, Nb)C | Mo$_2$C | ZrN | TaC | Content | Co proportion | Ni |
| 10 | 20 | 41.8 | 5 | 0.2 | 5 | 16 | 88.9 | 2 |

Average grain size of WC powder of cemented carbide layer: 3.0 μm
Average grain side of WC powder of cermet layer: 3 μm
Average grain size of TiCN powder: 3 μm
Average grain size of (Ti, W, Nb)C: 3 μm, Composition ration (mass ratio): 60TiCN—30WC—10NbC
Average grain side of Mo$_2$C powder: 3 μm
Average grain side of ZrN powder: 1 μm
Average grain side of TaC powder: 3 μm The obtained laminated green compacts were sintered under the conditions of 1480° C.×60 min in vacuum atmosphere, thereby obtaining a composite materials having a two-layer structure having a cemented carbide layer in such a manner as to entirely cover one surface of the square pole-like cermet layer. After sintering, when the composition of the cermet layer of the obtained composite materials was observed by SEM, the cermet layer had a structure in which particles having a core-containing structure having a peripheral portion containing (Ti, W, Mo, Ta, Nb) (C, N) are present on the periphery of the core (black core) containing TiCN. The thicknesses h1 and h2 in the lamination direction were measured in the same manner as in Test Example 1. Then, in all the obtained composite materials, the thickness h1 in the lamination direction is 4.76 mm, the thickness h2 in the lamination direction of the cemented carbide layer is 476 μm (h2/h1=0.1), and the thickness is almost uniform throughout the cemented carbide layer. The thickness of the cemented carbide layer may be partially different. These composite materials are measured for the amount of the binder phase of each layer, the total content of W and WC of the cermet layer (the W+WC amount), and the average grain size of WC of the cemented carbide layer in the same manner as in Test Example 1. The measurement shows that the binder phase amount y1 of the cemented carbide layer is 16.2 volume %, the binder phase amount y2 of the cermet layer is 16.5 volume %, y1/y2 is 1.0, the W+WC amount is 33.2 mass %, and the average grain size of WC is 3.4 μm.

The obtained composite materials were measured for the maximum depth (the depth of irregularities) $D_{max}$ of the concave portion and analyzed for the presence of the separation of the cemented carbide layer and the presence of the deformation of the composite material. The results are shown in Table XVI. The measurement method and the evaluation method are the same as those of Test Example 1.

TABLE XVI

| Sample No. | Depth of irregularities (μm) | Presence of separation after sintering | Presence of deformation after sintering |
|---|---|---|---|
| 900 | 0 | C | A |
| 9-1 | 30 | C | A |
| 9-2 | 50 | A | A |
| 9-3 | 150 | A | A |
| 9-4 | 350 | A | A |
| 9-5 | 400 | A | A |
| 9-6 | 1000 | A | C |

Table XVI shows that, also in the composite materials produced in this test, as the maximum depth (the depth of irregularities) of the concave portion becomes large, the cemented carbide layer is difficult to separate and when the maximum depth thereof is excessively large, deformation occurs similarly as in Test Example 1. Therefore, the test also shows that when the maximum depth of the concave portion satisfies a given range, a composite material is obtained in which the separation between the cemented carbide layer and the cermet layer is difficult to occur and the deformation is small. Moreover, it is considered that such a composite material can be suitably used for bases of cutting tools because the composite material can sufficiently make the most of the properties of both the cemented carbide layer and the cermet layer similarly as in Test Example 1.

Test Example 10

Cutting tools containing a composite material were produced in the same manner as in Test Example 9, and the cutting performance was analyzed. In this test, composite materials having a three-layer structure as shown in FIG. 5 were produced while changing the thickness of the cemented carbide layer in the cutting tool (base) produced in Test Example 9. More specifically, laminated green compacts having a three-layer structure were produced in the same manner as in Test Example 2, the green compacts were sintered under the same conditions as those of Test Example 9, and then composite materials of Sumitomo Electric Industries, Ltd., Model No.: SNMG120408N-UX were obtained. At the boundary between each layer of the obtained composite materials, irregularities following the shape of the punch or irregularities (concave portions) not following the shape of the punch are observed as shown in FIG. 5. In the composite materials, the thickness h1 is 4.76 mm, the maximum depth $D_{max}$ of the concave portion is 200 μm, the average grain size of the WC particles of the cemented carbide layer is 3.4 μm, the W+WC amount is 33.2 mass %, the Cr proportion of the cemented carbide layer is 0.06, and the Co proportion of the cermet layer is 88.9 mass %. The binder phase amount ratio y1/y2 of both the layers of the composite materials is analyzed in the same manner as in Test Example 1, all the samples satisfy y1/y2: 0.8 to 1.2. The edge line formed with the cemented carbide layer of the composite materials is partially subjected to cutting edge treatment (cutting edge treatment width (refer to FIG. 2): 0.04 mm) to be formed into a cutting tool in the same manner as in Test Example 2. The rake face of the cutting tool is formed with the cemented carbide layer and the flank face is formed with a lamination surface of the cemented carbide layer and the cermet layer.

For comparison, a cutting tool (base) not having a cemented carbide layer, i.e., a cutting tool containing only cermet (thickness h1: 4.76 mm) was produced.

Using the obtained cutting tools, cutting tests (turning processing in every case) were performed under the cutting conditions shown in Table XVII and the wear resistance and toughness (breakage resistance) were analyzed. The results are shown in Table XVIII. The obtained cutting tools were analyzed for the separation state of the cemented carbide layer. The results are shown in Table XVIII. The evaluation of the separation state is the same as that of Test Example 1, the evaluation of the toughness is the same as that of Test Example 2, and the evaluation of the wear resistance is the same as that of Test Example 3.

TABLE XVII

| Cutting conditions | Breakage resistance Without coated film | Wear resistance Without coated film |
|---|---|---|
| v m/min | 100 | 100 |
| f mm/rev. | 0.2 | 0.3 |
| d mm | 2.0 | 1.5 |
| Time (pass) | 30 sec | 30 min |
| Work | SCM 435-4 groove | SCM435 |
| Presence of lubricant | dry | dry |
| Tip shape | SNMG120408N-UX | SNMG120408N-UX |

TABLE XVIII

Cutting tool (without coated film)

| Sample No. | Thickness of cemented carbide layer (μm) [h2/h1] | Presence of separation after sintering |
|---|---|---|
| 1000 | None [0] | — |
| 10-1 | 50 [0.01] | A |
| 10-2 | 100 [0.021] | A |
| 10-3 | 200 [0.042] | A |
| 10-4 | 300 [0.063] | A |
| 10-5 | 500 [0.105] | A |
| 10-6 | 1000 [0.21] | A |
| 10-7 | 2000 [0.42] | C |

Cutting tool (without coated film)

| Sample No. | Thickness of cemented carbide layer (μm) [h2/h1] | Breakage resistance Number of impacts (times) | Wear resistance Wear amount (mm) |
|---|---|---|---|
| 1001 | None [0] | 2335 | 0.23 |
| 10-11 | 50 [0.01] | 2515 | 0.25 |
| 10-12 | 100 [0.021] | 2969 | 0.25 |
| 10-13 | 200 [0.042] | 3295 | 0.24 |
| 10-14 | 300 [0.063] | 3391 | 0.25 |
| 10-15 | 500 [0.105] | 3395 | 0.24 |
| 10-16 | 1000 [0.21] | 3462 | 0.23 |
| 10-17 | 2000 [0.42] | Test is not performed due to the separation of the cemented carbide layer during sintering. | |

Table XVIII shows that even when concave portions having a given maximum depth are provided, the separation occurs depending on the thickness of the cemented carbide layer. It is also revealed that, by providing the cemented carbide layer, the toughness is improved. Furthermore, it is revealed that the toughness can be improved by adjusting the size of the WC of the cemented carbide layer or the composition of the cermet layer.

The embodiments described above can be suitably modified without departing from the scope of the invention and are not limited to the above-described structures. For example, the composition or the type of the coated film of the cemented carbide layer and the cermet layer, the film forming method, etc., can be changed. For example, a composite material may be formed by granulating particles with a given size, and sintering a green compact produced by performing only main press without performing prepress.

INDUSTRIAL APPLICABILITY

The composite material of the invention can be suitably utilized for base materials of cutting tools, such as a drill, an end mill, a cutting edge exchange type tip for milling processing, a cutting edge exchange type tip for turning, a metal saw, a gear cutting tool, a reamer, or a tap. The coated cutting tool of the invention can be suitably utilized for cutting processing in which excellent wear resistance and toughness are desired.

The invention claimed is:

1. A composite material, comprising:
a cemented carbide layer and a cermet layer that are laminated, the cemented carbide layer having an inner surface facing the cermet layer and an outer surface opposite the inner surface,
wherein:
the cemented carbide layer is disposed on at least one portion of the surface side of the composite material,
the outer surface of the cemented carbide layer and a boundary between the cemented carbide layer and the cermet layer having a concave portion, the concave portion having a maximum depth of 50 μm or more and 500 μm or lower,
the thickness of a portion having the largest thickness in the lamination direction being defined as h1 and the thickness of a portion having the largest thickness in the lamination direction of the cemented carbide layer disposed on the surface side of the composite material being defined as h2, h2/h1 being more than 0.02 and 0.4 or lower in the composite material,
the cermet layer contains WC and W in a proportion of 15 mass % or more and 40 mass % or lower in total,
the cemented carbide layer contains W and WC in a higher proportion than the cermet layer,
the cemented carbide layer is provided on an outer surface of the cermet layer, and
the cemented carbide layer contains WC particles as a main hard phase and the cermet layer contains Ti compounds as a main hard phase.

2. The composite material according to claim 1, wherein the cemented carbide layer contains a binder phase containing an iron-group metal and Cr, and when the amount of the binder phase is defined as ×1 (mass %) and the content of the Cr is defined as ×2 (mass %), ×2/×1 is in the range of 0.02 or more and 0.2 or lower.

3. The composite material according to claim 1, wherein the cemented carbide layer and the cermet layer have a binder phase containing an iron-group metal, and when the content of the binder phase of the cemented carbide layer is defined as y1 (volume %) and the content of the binder phase of the cermet layer is defined as y2 (volume %), y1/y2 is in the range of 0.8 or more and 1.2 or lower.

4. The composite material according to claim 1, wherein the cermet layer has a binder phase containing an iron-group metal, and the iron-group metal in the binder phase contains Co in a proportion of 80 mass % or more.

5. A coated cutting tool, comprising:
a base containing the composite material according to claim 1; and
a coated film formed on the surface of the base,
the coated film being formed by a CVD method.

6. A coated cutting tool, comprising:
a base containing the composite material according to claim 1; and
a coated film formed on the surface of the base,
the coated film being formed by a PVD method.

7. The coated cutting tool according to claim 6, wherein the average grain size of hard phase particles in the cemented carbide layer is 0.1 μm or more and 1.0 μm or lower in the base.

8. The coated cutting tool according to claim 5, wherein the cemented carbide layer has a cutting edge treatment portion and the cutting edge treatment width is 0.05 mm or lower in the base.

9. The composite material according to claim 1, wherein the cemented carbide layer contains W and WC in a proportion of more than 65 mass % in total.

10. The composite material according to claim 1, wherein the cermet layer is sandwiched between a pair of the cemented carbide layers.

11. The composite material according to claim 1, wherein an entirety of the outer surface of the cermet layer is covered by the cemented carbide layer.

12. The coated cutting tool according to claim 5, wherein the cermet layer is an internal layer of the base.

13. The coated cutting tool according to claim 12, wherein the cermet layer is sandwiched between a pair of the cemented carbide layers.

14. The composite material according to claim 12, wherein an entirety of the outer surface of the cermet layer is covered by the cemented carbide layer.

15. The coated cutting tool according to claim 6, wherein the cermet layer is an internal layer of the base.

16. The coated cutting tool according to claim 15, wherein the cermet layer is sandwiched between a pair of the cemented carbide layers.

17. The composite material according to claim 15, wherein an entirety of the outer surface of the cermet layer is covered by the cemented carbide layer.

18. The composite material according to claim 1, wherein the cermet layer contains hard phase particles of Ti compound and the average grain size of the hard phase particles in the cermet layer is 0.5 μm or more and 5.0 μm or less.

19. The composite material according to claim 1, wherein the cermet layer contains hard phase particles of Ti compound and the average grain size of the hard phase particles in the cermet layer is 1.0 μm or more and 3.0 μm or less.

20. The composite material according to claim 1, wherein the cemented carbide layer has a compression stress of 0.1 GPa or more and 3.0 GPa or less.

21. The composite material according to claim 1, wherein a shape of the outer surface of the cemented carbide layer and a shape of the boundary between the cemented carbide layer and the cermet layer are similar to each other.

* * * * *